May 2, 1939.　　　H. C. YAEGER　　　2,156,614
TYPEWRITING MACHINE
Filed April 19, 1937　　　5 Sheets-Sheet 1

INVENTOR:
Harry C. Yaeger
BY
ATTORNEY.

May 2, 1939.  H. C. YAEGER  2,156,614
TYPEWRITING MACHINE
Filed April 19, 1937  5 Sheets-Sheet 2

Fig. 3.

INVENTOR:
Harry C Yaeger
BY B C Stickney
ATTORNEY.

May 2, 1939. H. C. YAEGER 2,156,614
TYPEWRITING MACHINE
Filed April 19, 1937 5 Sheets-Sheet 3

INVENTOR:
Harry C Yaeger
BY B C Stickney
ATTORNEY.

May 2, 1939.  H. C. YAEGER  2,156,614
TYPEWRITING MACHINE
Filed April 19, 1937  5 Sheets-Sheet 4

INVENTOR:
Harry C. Yaeger
BY
B. C. Stickney
ATTORNEY.

May 2, 1939. H. C. YAEGER 2,156,614

TYPEWRITING MACHINE

Filed April 19, 1937 5 Sheets-Sheet 5

INVENTOR:
Harry C. Yaeger
BY
ATTORNEY.

Patented May 2, 1939

2,156,614

UNITED STATES PATENT OFFICE 2,156,614

TYPEWRITING MACHINE

Harry C. Yaeger, West Hartford, Conn., assignor to Underwood Elliott Fisher Company, New York, N. Y., a corporation of Delaware Application April 19, 1937, Serial No. 137,702

43 Claims. (Cl. 197—149)

This invention relates to typewriters and more especially to those in which the type-system includes type-carriers which are thrust rearwardly against a rotatable platen when the key-levers are depressed. The latter class of typewriters is shown in patent to Going, 1,604,640. In the type-system itself precision is of the essence, and forward and rearward relative adjustability of the type and the platen needs to be provided for the entire type-system, both individually and collectively.

Each unit of the type-system includes a supporting bracket on which are pivoted guiding arms for a type-bar slide.

The adjustment of the entire type-system collectively relatively to the platen is shown in patent to Going, 1,883,698, in which a platen-carriage support is adjustable fore and aft.

A feature of the invention is an improved mounting, consisting of a unitary casting providing two concentric arcuate supports for the brackets of the type-system, the rear support having not only a comb for guiding the lower edges of the type-bar slides, but having also the forward arcuate ledge, on which the rear ends of the brackets are hooked, and which may be easily formed on a lathe. According to the present improvements, by mounting on the rear arcuate support of the unitary casting a depending comb, below and to the rear of the arcuate ledge, the slots thereof may be cut on a milling machine. The improved depending comb displays rigidity of the vertical mounting of the bracket of each type-unit, and so improves the performance of each type-action, by preventing friction and binding.

The fact that the entire type-system is adjustable forwards and backwards as a unit adds to the advantages accruing from a unitary integral casting for making the adjustment with reference to the typewriter frame because the rigidity and immovability inherent in the unitary casting assure the continuity of predetermined relationships of parts of and among the units of the type-system.

A relative transverse adjustment of the typewriter frame and the type-system support is made possible, as well as the primary forward and backward adjustment which latter carries the type-system toward or away from the platen. The transverse adjustment of the type-system support on the frame is effected by four screws which engage the inner walls of the frame. By turning back the screws the entire support and type-system can be lifted up and out of the frame or reinserted therein. A transverse adjustment of the support may be made, and yet the support may be locked tightly on the frame.

A novel manually operated device is provided which assures an equalized positioning of both outer walls of the type-system support, and includes a transverse rod rotatably mounted in the frame of the typewriter and a handle mounted in an accessible place on the outer wall of the typewriter for rotating the rod. Each of two eccentric cams engages the head of a forwardly and rearwardly adjustable screw mounted on the front of the support at either side. Springs tend to hold the cams in continuous engagement with the screw heads. In a modification inclined cams are used.

The adjustment of the type-system support carries forwardly or rearwardly the ribbon cups formed in the top thereof. Elongated apertures, formed in the bottom of each cup, admit the vertical shafts for the ribbon spools in any position of adjustment.

Another feature of the invention is a simple device for use with an eccentric cam to prevent any transverse movement between the cam and the part cammed. A flat spring is mounted across the cam in the transverse plane and is fixed on the part which mounts the rotatable cam. The friction acts on the flat-spring interponent and no transverse motion is transmitted to the part cammed. In using this improvement between a platen-carriage and a type-system only horizontal motion can be transmitted between a type and the platen but otherwise relative vertical motion might throw the type and the platen out of proper adjustment, causing imprinting below or above the line.

Other features and advantages will hereinafter appear.

In the accompanying drawings.

Figures 1, 2:
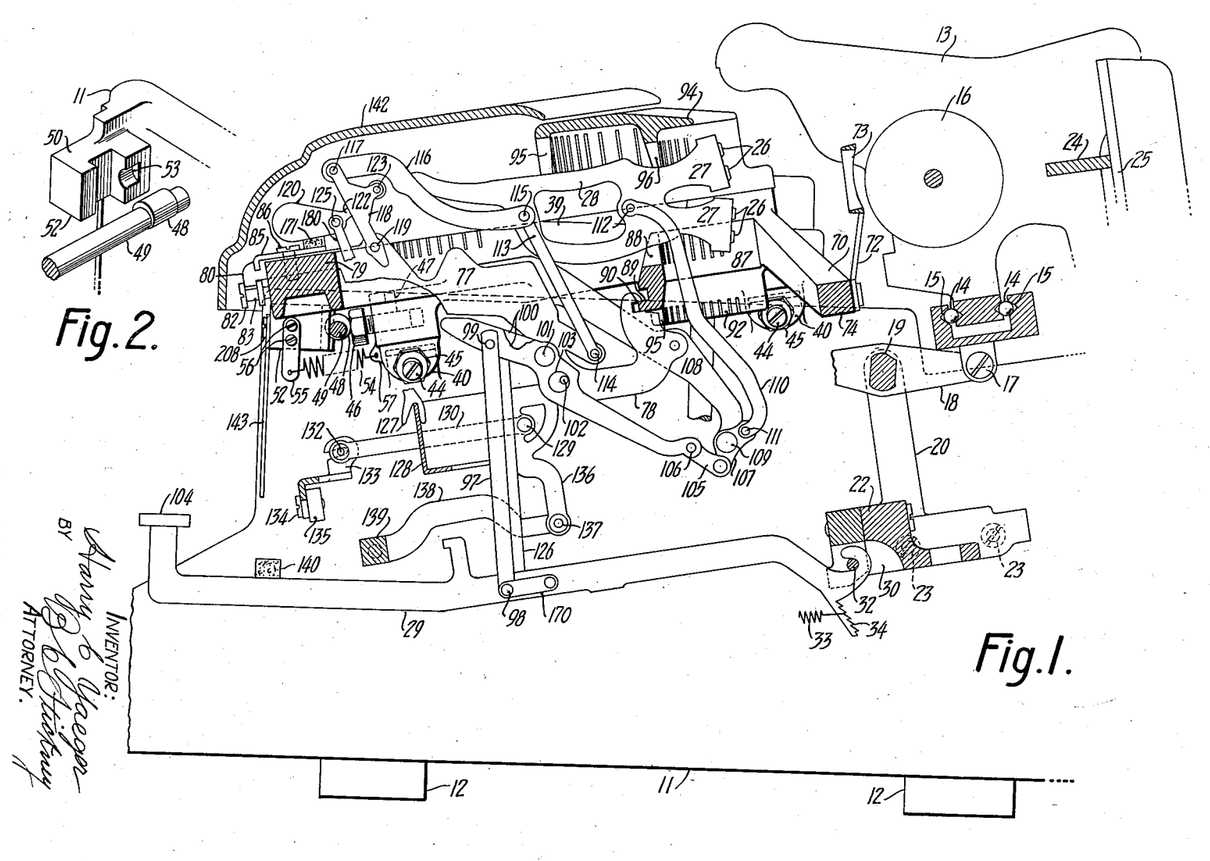
Figure 1 is a side elevation partly in section.
Figure 2 is a perspective view showing the mounting for an eccentric cam, with the cam and its supporting rod offset from the frame.

The typewriter shown has a frame 11 supported on feet 12 and a carriage 13 mounted by ball-bearings 14 on a vertically shiftable track 15, and which rotatably supports a platen 16. Screws 17 horizontally pivot the track 15 on the rear end of a shift-lever 18 pivotally mounted, together with a cross-piece 19, on the top of an upright 20 supported on a key-lever bracket 22 fastened in the frame 11 by screws 23. A brace 24 is mounted in the carriage 13 and slidably engages an upright arm 25 which resists rearward yielding of the carriage 13 under pressure from a type 26 carried by type-heads 27 of a type-carrier 28, which is slidable forwards and rearwards and upwardly or downwardly according to which key-lever 29 may be depressed under the quaternate control shown in the patent to Going, 1,604,640. Each key-lever 29 is pivotally mounted at the rear end in a slot 30 on a pivot rod 32 and a spring 33 adjustable on the toothed rack 34 tends to maintain the lever 29 in the upper position.

Figure 4:
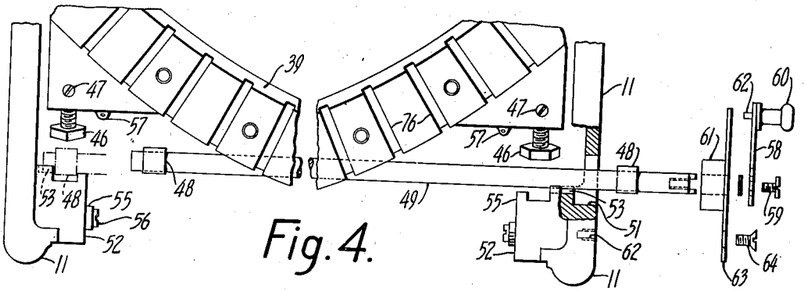
Figure 4 is a top plan view, parts broken out and sectioned, showing the adjusting rod partly removed from the frame.

Near the top of the frame 11 on each side is an inwardly turned ledge 35 as shown in Figure 4, the inner top surface of which forms a flat but upwardly and rearwardly inclined track 36 a bit lower than the top of the rest of the ledge 35 and bounded by an outer vertical wall 37. Under each track 36 each ledge has a downwardly and outwardly projecting wall 38 in the form of an inclined flat surface.

Figure 5:
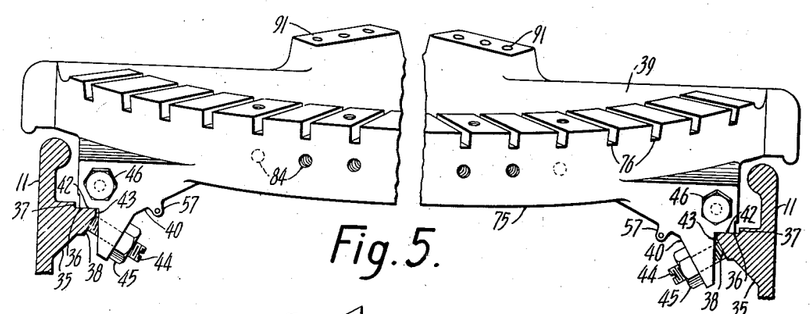
Figure 5 is a front elevation, parts broken out and sectioned, showing the construction for slidably and releasably mounting the support on the frame.

A support 39 for the type-system is a unitary casting having on the lower surface near each outer edge and near the front and rear a depending ridge 40, four in all, the lower outer wall of which is incut perpendicularly to form a flat track 42 and to leave the lower outer wall 43 flat and perpendicular. The perpendicular distance between the outer walls of the depending ridges 40 is substantially less than that between the vertical walls 37 and the perpendicular distance between lower outer walls 43 is substantially less than that between the inner edges of the depending ledges 34, the difference in each case being the same and sufficient to permit the facile vertical insertion of the lower portions of the ridges 40 within the ledges 35 to position the tracks 42 in sliding engagement with tracks 36, and a lateral adjustment of the support 39 on the frame 11. Screws 44 project upwardly and outwardly through the depending ridges 40 and when turned in engage the inclined walls 38 and so lock the support 39 slidably forwards and backwards but against lateral movement or vertical movement. The setting of screws 44 may be varied to adjust the support 39 laterally. To prevent accidental variation in the set positions of the screws 44 each screw 44 carries a locking nut 45 which is lockingly engageable with inwardly and upwardly inclined walls of the ridges 40.

An equal and simultaneous forward and backward adjustment of both sides of the support 39 is procured as now set forth. Adjustable screws 46 are mounted heads forward on either side of the support 39 and are locked in any set position by set-screws 47 in the top of the support 39. Eccentric cams 48 engage the heads of screws 46, a cam on each screw, are rotatably mounted on a rod 49 which is locked against endwise movement by vertical recesses 50 in the rear walls of lugs 52 inwardly turned from the sides of the frame 11, and are rotatably mounted in semicircular bearings 53, one at each end of the rod 49. Springs 54, one on either side, are tied, at the front to fingers 55 secured by screws 56 on the inside of each lug 52, and at the rear to ears 57 depending one on each side of the support 39, and tend to hold the support 39 in a forward position with the screws 46 in frictional contact with the eccentric cams 48. Since the eccentric cams 48 are symmetrically positioned on the rod 49 the rotation of the latter may move the support 39 directly and truly towards the platen 16, or permit movement away from the platen under tension from strong springs 54.

At the right end of the rod 49 is fastened one end of an arm 58 by means of a screw 59 and on the other end of the arm 58 is mounted a finger-piece 60 having a pin 62 which is spring-pressed towards the side of the typewriter. A disk 63 is mounted on and held against the outside of the frame 11 by the arm 58 and a screw 64 and has radially disposed holes 65 for engaging the pin 62 and locking the arm 58 in various rotative adjustments. To adjust the arm 58 the finger-piece 60 is pulled away from the disk 63 to release the pin 62 from one of the holes 65. The radial disposition of holes 65 may be related to the thickness of work-sheets. The finger-piece 60 may be rotated in either direction. A recess 51 in the side of the frame 11 facilitates the assembly of the rod 49 from the right side and receives a hub 61 of a disk 63 which acts as a permanent bearing after the eccentrics 48 are positioned in their proper recesses and the hub 61 is slipped over the right end of the rod 49 and the screw 59 passed through the arm 58 and the disk 63 into the end of this rod.

Figure 3:
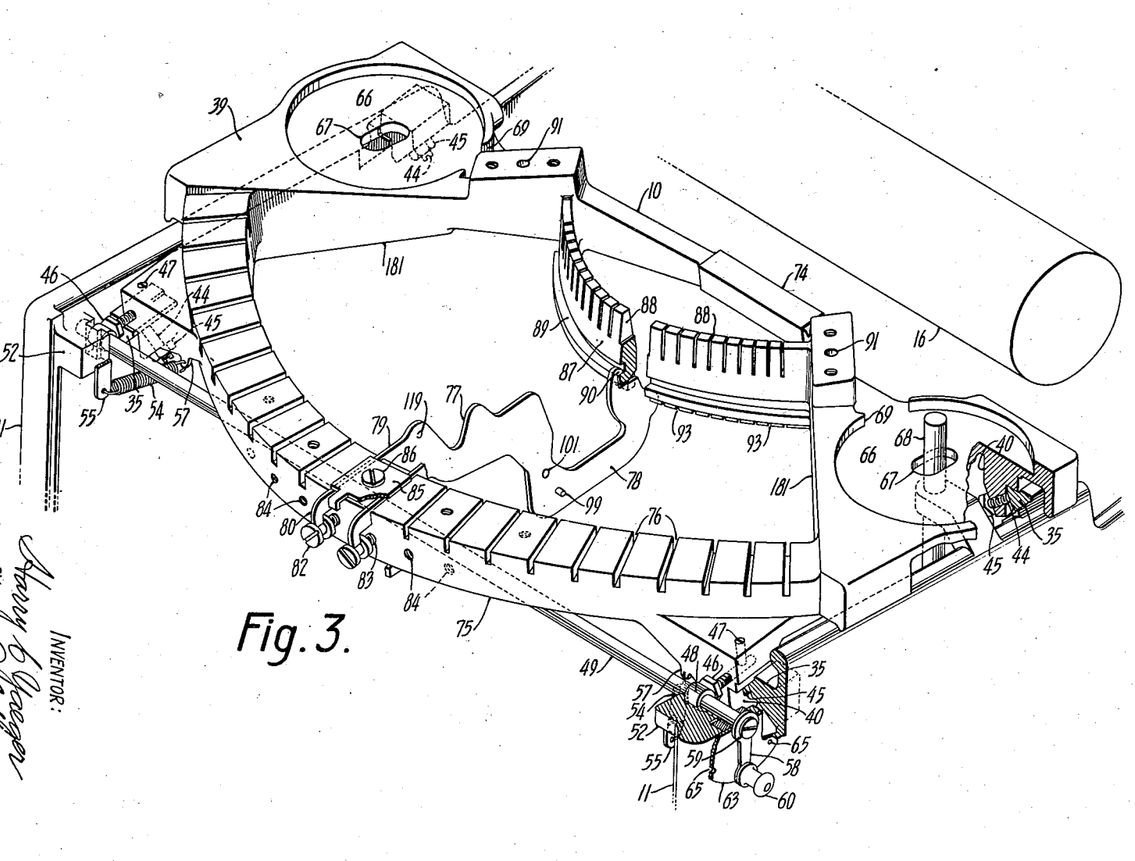
Figure 3 is a perspective view, with parts in section, of the top of the frame and the adjustable and removable support for the type-bar system mounted thereon.

The support 39 for the type-system is a unitary casting having ribbon cups 66 formed in the top wall at either side and to the rear. At the center of each cup 66 is a forwardly and rearwardly extending aperture 67 up through which projects a ribbon-spool actuating shaft 68 centrally fixed in each aperture 67, the elongation of the apertures 67 providing for the forward and backward adjustment of the support 39. Inner openings 69 in the side walls of the cups 66 permit the passage of a ribbon between the type 26 and the platen 16.

The rear of the support 39 is a downwardly and rearwardly extending cross-bar 70 rectangular in cross-section to the rear vertical wall of which and intermediate the ends thereof is secured an upright 72 which supports on its upper end a type-guide 73. The central portion 74 of the cross-bar 70 extends in a straight line for a substantial proportion of the total length and extends below and to the rear of any other portion of the cross-bar 70, in the form shown in the drawings, the proportion being one-third. The front of the casting 39 is a forwardly convexed arcuate bar 75 having a flat top wall in which are cut a plurality of radial slots 76, one for each unit 77 of the type-system, each unit 77 comprising a bracket 78 formed to support a quaternary type-action. The forward part of each bracket 78 comprises a flat-topped extension 79, the width of which is a bit more than the depth of a slot 76, terminating at the front in a downwardly extending finger 80 which lies within the spool-form head 82 of a screw 83 adjustable forwards and backwards in one of the screw-holes 84 in the front of the arcuate bar 75. A plate 85 overlies each part 79 and a screw 86 locks the bracket 78 in the bar 75, by means of the plate 85.

A second concentric arcuate bar 87 lies to the rear of the arcuate bar 75, the top of which is lower than a plane through the bottoms of the slots 76, and the cutting of these slots is easily effected on a milling machine. The upper part of the bar 87 forms a comb of radial slots 88 for guiding the lower ends of the type-carriers 28. The front wall of the bar 87 is undercut to form a flat arcuate ledge 89, this part of the casting being easily accessible to a planing machine without interference of any other part of the casting 39. A hook 90 formed on the upper rear end of each bracket 78 engages the ledge 89 and supports the brackets 78 in any adjusted position.

Figure 8:
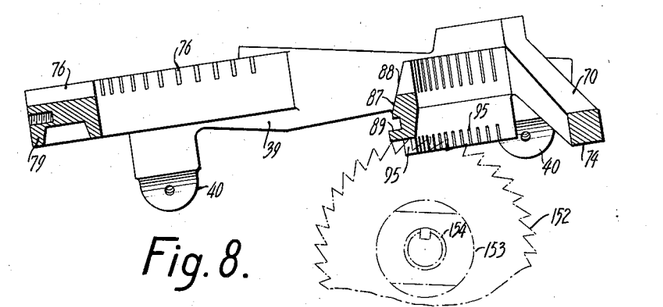
Figure 8 is a vertical section through the middle of the unitary type-system support showing the relationship of the cutting tool to the unitary casting.

Referring to Figure 8 a cutter 152 is supported on a milling machine (not shown) by a hub 153 keyed on a shaft 154. It is clear also why slots (as formerly cut) can not be cut in the forward, lower arcuate edge of the ledge 89 of a single, unitary casting 39; the shaft 154 would interfere with the depending ridges 40 and other parts of the support 39 and prohibit the insertion of the cutting tool, necessitating the making of the type-action support 39 with a separable rear bar 87. The depending comb slots 95, however, are easily cut, the unitary construction giving a great saving in the cost of manufacture. The casting 39 has straight inner side walls 181 radiating from the geometrical center of the arcuate bars 75, 87 or from a point in advance thereof. The parts of the casting 39 are all so related that every part is accessible for machining operation in manufacture.

The bottom of the bar 87 has an arcuate depending ridge 92 in which are cut radial slots 93 corresponding to slots 76 and which receive a front end of each bracket 78 to support it rigidly in a vertical plane. No other part of the casting 39 interferes so that the radial slots 93 are easily cut with a milling machine. A casting 94 has two combs 95, 96 providing concentric slots for guiding the top edges of type-carriers 28 towards and away from the platen 16 and is fixed on the support 39 by means of the screw-holes 91.

The bracket 78 is shown with a quaternary type-action for swinging the upper type-head 27 through the type-guide 73, the quaternary type-action for moving the lower type-head 27 through the type-guide 73 lying to the rear but not being shown. A link 97 is pivoted to the snap-fastener 170 at 98, the snap-fastener 170 being secured on the side of the key-lever 29, and at the upper end at 99 to the rear arm of a lever 100 pivoted at 101 to the fixed bracket 78. A stop-pin 102 fixed in the side of the bracket 78 lies in a circular hole 103 in the forward part of the lever 100 and checks the depression of a key 104 on the key-lever 29. An upward pull on a link 105 pivoted at lever 29, tilts a lever 106 to the front end of the lever 100 tilts a lever 107 clockwise on pivot 109 on a bracket arm 108 to pull down on a link 110 pivoted at 111 to the upper end of the lever 107. The upper end of the link 110 is tied by a pivot pin 112 to the type-carrier 28. A link 113 is secured by a pivot pin 114 to the bracket 78 and by a pivot pin 115 to the rear portion of the type-carrier 28. A rearwardly extending link 116 is also pivoted at 115 to the type-carrier 28 and at the rear at 117 to the upper end of an arm 118 which is pivoted at the lower end at 119 to the top of the bracket 78. A momentum accelerator 120, which normally rests on a cushion stop 171 overlying plates 85, has a rearwardly projecting arm 122 pivotally connected at 123 to the arm 118. An upper arm 124 of a bell-crank 180 is pivoted on the accelerator 120 at 125, the bell-crank being pivoted on the bracket 78 and having a forwardly extending arm depressible by the lower rear edge of the lever 100, see Figure 9, as known and used in the Underwood noiseless typewriter. Another link 126 is connected with an adjacent key-lever 29 and operates another quaternary type-action (not shown) pivoted on the opposite side of the bracket 78. A forked arm 127 is connected with and depressible by the type-action to depress an arcuate universal bar 128 pivoted at 129 on an arm 130, the front end of which is pivoted at 132 in a bracket 133 secured by a screw 134 to a cross-piece 135 mounted in the frame 11. The universal bar 128 has a depending limb 136 pivoted at 137 to an arm 138 fixed on a rock-shaft 139 mounted in the frame 11. A cushion-stop 140 engages the top of the key-lever 29. A canopy 142 overlies the front of the typewriter and a front cover plate 143 the front of the typewriter, all as in the Underwood noiseless typewriter.

Figure 6:
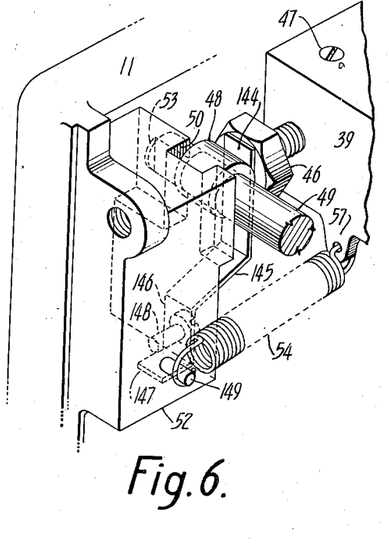
Figure 6 is a perspective view showing an improved camming device for moving the type-system support rearwardly and forwardly but preventing any transverse movement that would vertically displace the type relatively to the platen.

Referring to Figure 6 the left front corner of the support 39 is shown with a headed screw 46 mounted therein. The eccentric cam 48 is mounted on the rotatable rod 49, the left end of which lies in the semi-cylindrical bearing 53, the cam 48 being turnable in the vertical recess 50 in the rear wall of the lug 52 mounted on the inner left wall of the frame 11. A flat spring 144 is transversely interposed between the head of the screw 46 and the rear face of a cam 48, and has a forwardly and downwardly inclined bend 145 terminating in a flat depending part 146 and a forwardly inclined tab 147 underlying the lug 52. A screw 148 passes through the depending part 146 and anchors the spring 144 in fixed position on the rear of the lug 52. A stout spring 54 is tied at the rear in a depending lug 57 and at the front is looped over a pin 149 and the head of the cam 48, the spring 144 and the head of the screw 46 in continuous contact. Any frictional binding between the surfaces of the cam 48 and the head of the screw 46 which would tend to displace them transversely with reference to each other is now entirely eliminated because in the improved construction any frictional binding between the cam 48 and the spring 144 is absorbed by the spring 144 and not transmitted to the head of the screw 46. Therefore relative upward or downward movement of the support 39 and the frame 11 caused by thrusts of the cam 48 on the head of the screw 46 is entirely eliminated, and so therefore relative vertical displacement of the type and the platen. It will be understood that the spring 144 may be used also between the cam 48 and the screw 46 at the opposite side of the typewriter.

Figure 7:
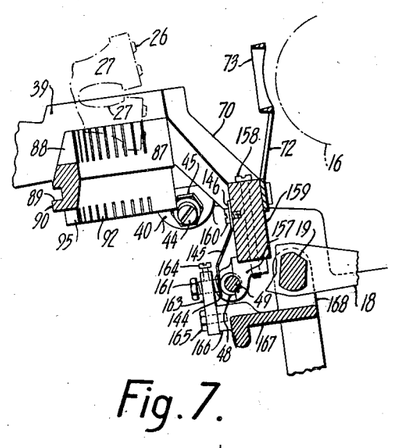
Figure 7 is a vertical section through the middle of the typewriter showing the improved camming device shown in Figure 6 but applied at the rear of the adjustable type-system support.

Referring to Figure 7 the transverse operating rod 49 mounts centrally the eccentric cam 48 and is mounted at either end in a depending bracket 157 secured by a screw 158 in a crosspiece 159, the latter being a part connecting the rear bars 70 in lieu of the central portion 74 of the casting 39 shown in Figure 3, and therefore mounting the upright 72 and the type-guide 73. The spring 144 is secured by the screw 160 on the front wall of the cross-piece 159 and depends from and overlies the front of the eccentric cam 48. An adjustable screw 161 engages the flat spring 144 on the side opposite the cam 48 and is mounted in the upright bracket 163. A set screw 164 is mounted in the top of the bracket 163 and engages the side of the screw 161. At the lower end a screw 165 holds the bracket 163 and is mounted on a forward arm 166 on a cross-piece 167, which also may support the case-shift frame 18, 19 in side uprights 168. The action is the same as in the form shown in Figure 6, the spring 144 absorbing any thrusts in the vertical plane.

Figure 9:
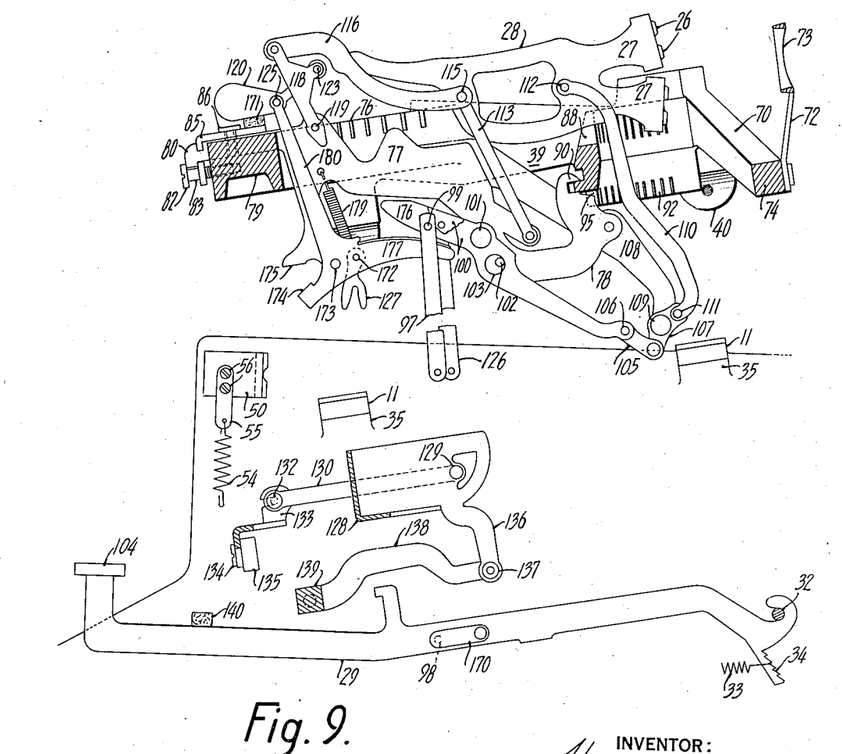
Figure 9 shows the type-system support and the supported type-action parts lifted up from the typewriter frame and clear of the universal bar and the fasteners on the type-bars.
Figure 10:
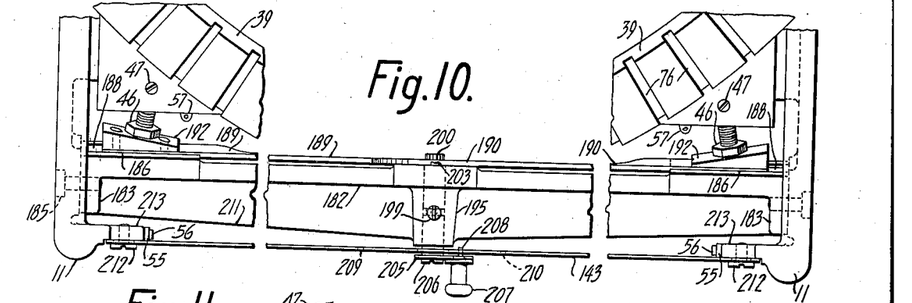
Figure 10 is a plan view showing a modification of the type adjusting device shown in Figure 4.

When the nuts 45 and the screws 44, as shown in Figure 5, are turned back to free the casting 39 from the frame ledges 35, the casting 39 and the supported type-action 77 may be lifted up as shown in Figure 9 after the links 97 have been separated at 98 from the snap-fasteners 170 and the spring 54 released from ears 57. All of the units 77 of the quaternary type action of the Underwood standard noiseless typewriter may be thus simultaneously lifted up as a group out of the machine or, conversely, set down into the typewriter. Parts of a quaternary type-action, not shown in Figure 1, include the bell-crank lever 180 pivoted at 173 on a forward dependency of the bracket 78 and having formed on itself a forwardly inclined stop 174 which in its upturned movement engages a forwardly inclined stop 175 formed on the forward dependency of the bracket 78. The forked arm 127 is pivoted at 172 on the bell-crank 180 so that the adjustment of the supporting casting 39 forwardly and backwardly does not practically affect the operative engagement of the arm 127 and the universal bar 128.

A coil spring 179 links the bracket 78 and the lower arm of the bell-crank 180 and tends to hold it up in the inoperative position, said lower arm having an upper convex engaging surface 177 engageable by a lower downward convex surface 176 on the rear end of the lever 180. Loosening of the screws 86 and the plates 85 permits the removal of the individual type units 78.

Figures 11, 12, 13, 14:
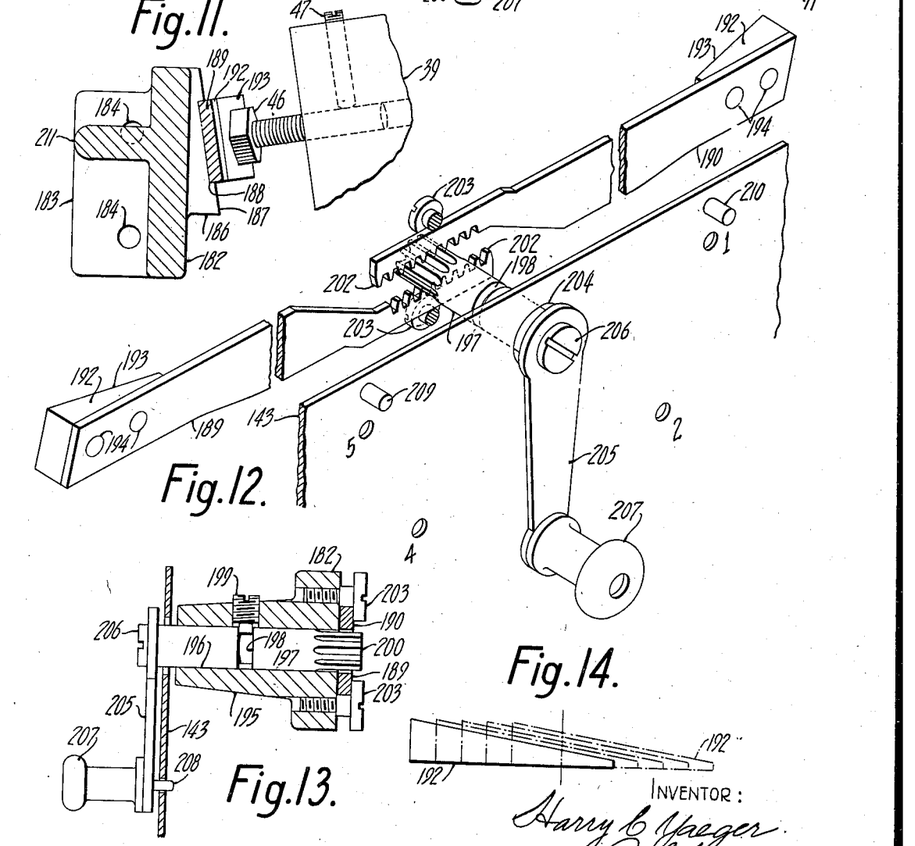
Figure 11 is a sectional elevation looking towards the left inclined cam.
Figure 12 is a perspective view of the centrally positioned actuating handle, the pinion, and racks on each arm mounting an inclined cam at the extremity.
Figure 13 is a central vertical section of the structure shown in Figure 12, from the right.
Figure 14 indicates the five lockable positions of the left inclined cam.

Referring to Figures 10, 11, 12, 13, and 14, in lieu of the device shown in Figure 4 for adjusting the type-action support 39 towards and away from the platen 16, a cross-piece 182 has at either end a forwardly projecting lug 183 having screw-holes 184 for receiving screws 185 passed through the sides of the frame 11. Formed on either end of the cross-piece 182 is a rear extension 186 having rear forwardly inclined walls 187 in which are formed horizontal grooves 188 in which are slidably mounted the outer ends of arms 189, 190, which are twisted into a plane parallel with the walls 187. Wedges 192 have rear camming faces 193 inclined inwardly, and contactable with the heads of screws 46, which are in this modification inclined outwardly and downwardly so that the flat tops of the heads are parallel with the inclined walls 187. The wedges 192 are mounted respectively on the rear walls of the arms 189, 190 by any suitable means such as screws 194. Projecting forwardly and centrally of the cross-piece 182 is a post 195 having an axial cylindrical bore 196. A shaft 197 is held rotatably in the post 195 by means of a circumferential groove 198 and a screw 199, the fillistered end of which is accessible outside the post 195. The inner end of the shaft 197 is cut to form radial teeth 200 of the same pitch and spacing as teeth 201, formed in juxtaposition on the inner ends of arms 189, 190 and which engage the sides of the teeth 200, the arms being held in engagement by headed screws 203 mounted above and below the arms 190, 189 respectively in the rear wall of cross-piece 182. The front end of the shaft 197 passes through an aperture 204 formed in the front cover plate 143 and mounts an arm 205 by a screw 206, the arm 205 carrying at its end a rotatable finger-piece 207 which is outwardly yieldable to withdraw a pin 208 from one of the locking holes, "1, 2, 3, 4, 5," formed in the plate 143, limiting stops 209, 210 mounted on the plate 143 being engageable with the arm 205. It is now clear that as the arm 205 is moved clockwise wedges 192 are synchronously and equidistantly pushed out and the support 39 moves forward under pull of springs 54 (see Figure 3) to increase the space between type 26 and the platen 16 (see Figure 1). So also counterclockwise movement of the arm 205 moves the support 39 back in a straight line to carry the type 26 nearer the platen 16. The spacing between the stop-holes "1, 2, 3, 4, 5" is equal so that the movement of a wedge 192 is synchronously directly proportioned, as shown in Figure 14. The heads of the screws 203 hold the inner ends of the arms 189, 190 snugly against the back of the cross-piece 182. Screws 212 hold the plate 143 against lugs 213 extending inwardly from the frame 11 in this modification rather than against the lugs 52 as shown in Figure 1. A reinforcing flange 211 enhances the rigidity of the cross-piece 182. The stop-holes "1, 2, 3, 4, 5" provide a scale for assisting in a precise setting of the type 26 with reference to the platen 16, according to the thickness of the work-sheet used.

Variations may be resorted to within the scope of the invention, and portions of the improvements may be used without others.

Having thus described my invention, I claim:

1. In a typewriter, a frame, a platen mounted for transverse movement on the frame, a type-system including type-carriers that slide rearwards and forwards towards and away from the platen, and a support for the type-system slidably mounted in the frame and liftable perpendicularly from the frame of the typewriter as a unit with the type-system.

2. In a typewriter, a frame, a platen mounted for transverse movement on the frame, a type-system including type-carriers that slide rearwards and forwards towards and away from the platen, and a support for the type-system having opposed tracks on the outer edges slidable forwardly and rearwardly on the frame, said support being liftable as a unit with the type-system from the frame.

3. In a typewriter, a frame, a platen mounted for transverse movement on the frame, a type-system including type-carriers that slide rearwards and forwards towards and away from the platen, a support for the type-system having outer opposed parallel tracks, parallel tracks on the frame engageable with the tracks on the support, and screws mounted on the support for engaging the frame and permitting forward and backward sliding movement of the support on the frame but locking the support against upward movement with reference to the frame.

4. In a typewriter, a frame, a platen mounted for transverse movement on the frame, a type-system including type-carriers that slide rearwards and forwards towards and away from the platen, a support for the type-system having outer opposed parallel tracks, parallel tracks on the frame engageable with the tracks on the support, an outwardly and downwardly extending wall under each frame track, and screws mounted on the support and engageable with each of said walls and permitting forwards and backwards movement of the support on the frame whereby lateral adjustment of the support on the frame may be obtained, but the support is locked against upward displacement on the frame.

5. In a typewriter, a frame, a platen mounted for transverse movement on the frame, a type-system including type-carriers that slide rearwards and forwards towards and away from the platen, brackets on which the type-carriers are supported and a support for the type-system that is a unitary metal casting and comprises, means for mounting the support on the frame, and two concentric arcuate bars, the outer arcuate bar having radial slots in the top for supporting the front ends of the brackets and the rear arcuate bar having radial slots in the top for slidably guiding the lower edges of the type-carriers, a front ledge for supporting the rear ends of the brackets, and a downwardly projecting comb of radial slots for rigidly maintaining the brackets in the upright position, all of said radial slots being millable on the support as a unitary casting.

6. In a typewriter, a frame, a platen mounted for transverse movement on the frame, a type-system including type-carriers that slide rearwards and forwards towards and away from the platen, brackets on which the type-carriers are supported and a support for the type-system that is a unitary metal casting and comprises means for mounting the support on the frame, two concentric arcuate bars, and a rear depending crossbar for mounting a type-guide, the outer arcuate bar having radial slots in the top for supporting the front ends of the brackets and the rear arcuate bar having radial slots in the top for slidably guiding the lower edges of the type-carriers, a front ledge for supporting the rear ends of the brackets, and a downwardly projecting comb of radial slots for rigidly maintaining the brackets in the vertical position, all of said radial slots being millable on the support as a unitary casting.

7. In a typewriter, a frame, a platen mounted for transverse movement on the frame, a type-system including type-carriers that slide rearwards and forwards towards and away from the platen, and a support for the type-system having opposed tracks on the outer edges slidable forwardly and rearwardly on the frame, a rod transversely and rotatably mounted in the frame, and a pair of symmetrically positioned eccentric cams mounted on the rod, one cam engaging the support near one outer edge and the other cam engaging the support near the other outer edge.

8. In a typewriter, a frame, a platen mounted for transverse movement on the frame, a type-system including type-carriers that slide rearwards and forwards towards and away from the platen, a support for the type-system having opposed tracks on the outer edges slidable forwardly and rearwardly on the frame, a rod transversely and rotatably mounted in the frame, a pair of symmetrically positioned eccentric cams mounted on the rod, one cam engaging the support near one outer edge and the other cam engaging the support near the other outer edge, and a stout spring fastened near each side of the support and to the frame for holding the cams in continuous engagement with the support.

9. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, a rod transversely and rotatably mounted in the frame, a pair of symmetrically positioned eccentric cams mounted on the rod, a cam engaging each of said screws, and means for rotating the rod.

10. In a typewriter, a frame, a platen mounted for transverse movement on the frame, a type-system including type-carriers that slide rearwards and forwards towards and away from the platen, a support for the type-system having opposed tracks on the outer edges and slidable forwardly and rearwardly on the frame, a rod transversely and rotatably mounted on the frame, a pair of symmetrically positioned eccentric cams mounted on the rod, one cam engaging the support near one outer edge and the other cam engaging the support near the other outer edge, and a handle mounted on the outside of the typewriter for rotating said rod.

11. In a typewriter, two members movable with reference to each other in predetermined directions, a cam mounted on one member and engageable with the other member for moving said other member, and a flat spring interposed between said members.

12. In a typewriter, two members movable with reference to each other in predetermined directions, a cam rotatably mounted on one member and engageable with the other member for moving said other member, and a flat spring interposed between said members.

13. In a typewriter, two members movable with reference to each other in predetermined directions, a cam rotatably mounted on one member and engageable with the other member for moving said other member, and a flat spring interposed between said members and mounted on the member that mounts the cam.

14. In a typewriter, two members movable with reference to each other in predetermined directions, a cam rotatably mounted on one member and engageable with the other member for moving said other member, and a flat spring interposed between said members, said flat spring having a bent-off portion mounted on the member that mounts the cam.

15. In a typewriter, two members movable with reference to each other in predetermined directions, a cam rotatably mounted on one member and engageable with the other member for moving said other member, and a flat spring interposed between said members, said flat spring having an angled portion mounted on the member that mounts the cam.

16. In a typewriter, two members movable with reference to each other in predetermined directions, an eccentric cam rotatably mounted on one member and engageable with the other member for moving said other member, and a flat spring interposed at right angles to and between said members.

17. In a typewriter, a frame, a platen mounted for transverse movement on the frame, a type-system including type-carriers that slide rearwards and forwards towards and away from the platen, and a support for the type-system comprising a unitary casting movable forwardly and rearwardly to adjust the type-system with reference to the platen, ribbon cups formed in said casting, and forwardly and rearwardly elongated apertures in the bottoms of said cups for permitting movement of the support with reference to vertical ribbon-operating shafts in the typewriter.

18. In a typewriter, a frame, a platen mounted for transverse movement on the frame, a type-system including type-carriers that slide rearwards and forwards towards and away from the platen, a support for the type-system slidable forwardly and backwardly, a rotatable cam on the front of the frame for moving the support toward the platen, and a spring for moving the support away from the platen, to adjust the type impression.

19. In a typewriter, a frame, a platen mounted for transverse movement on the frame, a type-system including type-carriers that slide rearwards and forwards towards and away from the platen, a support for the type-system slidable forwardly and backwardly, a cam on the front of the frame for moving the support toward the platen, and a spring for moving the support away from the platen, to adjust the type impression.

20. In a typewriter, a frame, a platen mounted on the frame, a type system including type-carriers slidable substantially horizontally, type-actions, and supporting brackets; and a support for the type-action mounted in the frame, having two concentric arcuate bars, the front bar having radial slots for the brackets, and the rear bar having a front ledge for supporting the brackets and having a depending comb providing radial slots for admitting and rigidly maintaining the brackets in operative position.

21. In a typewriter, a frame, a platen mounted on the frame, a type system including type-carriers slidable substantially horizontally, type-actions, and supporting brackets; and a support for the type-action mounted in the frame, having two concentric arcuate bars, the front bar having radial slots for the brackets, and the rear bar having a front ledge for supporting the brackets, and having a depending comb providing radial slots for admitting and rigidly maintaining the brackets in operative position, the support being an integral unitary casting all the parts of which are so related that all the slots are accessible to machine cutting tools in manufacture.

22. A single, unitary casting for supporting a pressure type-action having two concentric arcuate bars, the front bar having radial slots for the type-action, the rear bar having a front ledge for the type-action and depending radial slots for maintaining the type-action in operative position.

23. A single, unitary casting for supporting a pressure type-action having two concentric arcuate bars, the front bar having radial slots for the type-action, the rear bar having a front ledge for the type-action and depending radial slots for maintaining the type-action in operative position, the connecting parts of the casting having straight inner side walls radiating from a point proximal to the geometrical center of the arcuate bars.

24. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, a rod transversely and rotatably mounted in the frame, a pair of symmetrically positioned eccentric cams mounted on the rod, a cam engaging each of said screws, and means for rotating the rod, said means being detachably mounted on one end of the rod and said frame being apertured at one side to permit the endwise insertion of the rod.

25. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, and movable wedges engageable with the adjusting screws.

26. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, and synchronously movable wedges engageable with the adjusting screws.

27. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, and means for simultaneously engaging both screws and moving the support.

28. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, wedges engageable with the adjusting screws, and means external to the typewriter for moving the wedges.

29. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, a pair of arms, a wedge mounted on the outer end of each arm and engaging the head of the adjacent adjusting screw, and means for synchronously adjusting said arms.

30. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, a wedge mounted on the outer end of each arm and engaging the head of the adjacent adjusting screw, and means for synchronously adjusting said arms, mounted on the outside of the machine.

31. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, a pair of arms, a wedge mounted on the outer end of each arm and engaging the head of the adjacent adjusting screw, and means for synchronously adjusting said arms, mounted on the front wall of the machine.

32. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, a pair of arms, a wedge mounted on the outer end of each arm and engaging the head of the adjacent adjusting screw, the inner head of the adjacent adjusting screw, the inner ends of said arms having teeth, a circular rack having teeth engaging said teeth on both arms, and means for rotating the circular rack.

33. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, a pair of arms, a wedge mounted on the outer end of each arm and engaging the head of the adjacent adjusting screw, the inner ends of said arms having teeth, a circular rack having teeth engaging said teeth on both arms, and a crank for rotating the circular rack.

34. In a typewriter, a frame, a platen mounted for transverse movement on the frame, a type-system including type-carriers that slide rearwards and forwards towards and away from the platen, a support for the type-system slidably mounted on the frame, an adjusting screw mounted on the front wall of the support at either side, a pair of arms, a wedge mounted on the outer end of each arm and engaging the head of the adjacent adjusting screw, the inner ends of said arms having teeth, a circular rack having teeth engaging said teeth on both arms, a crank for rotating the circular rack, and means for holding the crank in a plurality of positions.

35. The combination with a platen and a set of front strike type-bars of the class described, a main frame, and a segment whereon the type-bars are mounted in front of the platen, of adjustable wedges mounted at opposite sides of the main frame and co-operating with a pair of inclined surfaces at the ends of said segment, an adjuster at the front of the machine, means connecting said adjuster to said adjustable wedges to effect similar backward or forward adjustment at the ends of said type-bar segment, and means tending to retain the segment where adjusted.

36. The combination with a platen and a set of front strike type-bars of the class described, a main frame, and a segment whereon the type-bars are mounted in front of the platen, of adjustable wedges mounted at opposite sides of the main frame and co-operating with a pair of inclined surfaces at the ends of said segment, an adjuster at the front of the machine, and a pair of links at the front of the machine, and a pair of links extending from said wedges to each other and having racks at their adjacent ends, said adjuster having a pinion engaging both racks for simultaneous equal adjustment of the wedges.

37. The combination with a platen and a set of front strike type-bars of the class described, a main frame and a segment whereon the type-bars are mounted in front of the platen, of adjustable wedges mounted at opposite sides of the main frame and co-operating with a pair of inclined surfaces at the ends of said segment, an adjuster at the front of the machine, a pair of links extending from said wedges to each other and having racks at their adjacent ends, said adjuster having a pinion engaging both racks for simultaneous equal adjustment of the wedges, and means for mechanically detaining said adjuster at a plurality of equally spaced stations, for regulating the extent of adjustment of the segment.

38. The combination with a platen and a set of front strike type-bars of the class described, a main frame, and a segment whereon the type-bars are mounted in front of the platen, of adjustable wedges mounted at opposite sides of the main frame and co-operating with a pair of screws carried at the ends of said segment, an adjuster at the front of the machine, a pair of links extending from said wedges to each other and having racks at their adjacent ends, said adjuster having a pinion engaging both racks for simultaneous equal adjustment of the wedges, means for mechanically detaining said adjuster at a plurality of equally spaced stations, for regulating the extent of adjustment of the segment, turning of either of said screws being effective to vary the relation of the wedges to said segment independently of said adjuster.

39. The combination with a platen, a set of type-bars, and a type-bar segment, said platen and said segment being relatively adjustable to vary the type impressions, or to accommodate different packs of work-sheets, of an inclined plane at each side of the type-bar segment, and a pair of wedges to co-operate with said inclined planes to vary the relative position of the platen and the printing types at the type-impact position.

40. The combination with a platen, a set of type-bars, and a type-bar segment, said platen and said segment being relatively adjustable to vary the type impressions, or to accommodate different packs of work-sheets, of an inclined plane at each side of the type-bar segment, a pair of wedges to co-operate with said inclined planes to vary the relative position of the platen and the printing types at the type-impact position, and means to effect relative adjustment at either one side of the machine or the other, to permit relative truing between the platen and the types, to secure uniformity of type impressions throughout the length of the line of typing, said means being adjustable simultaneously to vary the relative positions of the type and the platen at the printing impact, so as to accommodate work-sheets for manifolding as required.

41. In a typewriter, a frame, a platen mounted for transverse movement on the frame, a type-system including type-carriers that slide rearwards and forwards towards and away from the platen, a support for the type-system having opposite tracks, complemental tracks on the frame engageable with the support tracks, and releasable means engaging the frame tracks to lock the support against upward movement from the frame, but permitting forward and backward sliding movement, the release of said means permitting removal of the type-system from the typewriter as a unit.

42. In a typewriter, a frame, a platen mounted for transverse movement on the frame, a type-system including type-carriers that slide rearwards and forwards towards and away from the platen, a support for the type-system slidably mounted on the frame, a pair of screws each carried on opposite sides of said support, and a single adjustment means operative directly upon said screws for simultaneously sliding the respective sides of the support rearwards equidistantly, rotation of said screws effecting adjustment of said support independently of said adjustment means.

43. In a typewriter, a frame, a platen mounted for transverse movement on the frame, a type-system including type-carriers that slide rearwards and forwards towards and away from the platen, a support for the type-system slidably mounted on the frame, a single adjustment means operative upon opposite sides of the support for simultaneously sliding the respective sides of the support rearwards equidistantly, and a pair of springs yieldably urging the respective sides of the support forwardly in counteraction with the adjustment means.

HARRY C. YAEGER.